UNITED STATES PATENT OFFICE 2,568,597

2,4-DIAMINO PTERIDINES AND PROCESS OF PREPARING SAME

Doris R. Seeger, Bound Brook, N. J., assignor to American Cyanamid Company, New York, N. Y., a corporation of Maine No Drawing. Application October 22, 1947, Serial No. 781,495

16 Claims. (Cl. 260—251.5)

This invention relates to new organic compounds and to methods of preparing the same.

In the co-pending application of Coy W. Waller and John H. Mowat, Serial Number 606,704, filed on July 23, 1945, now Patent No. 2,500,296, there is disclosed the preparation of certain organic compounds having remarkable biological activity. Some of these, particularly the compound known as pteroylglutamic acid, more accurately designated as N-[4-{-[2-amino-4-hydroxy-6-pyrimido [4,5-b] pyrazyl) methyl] amino} benzoyl] glutamic acid, have found a wide usage in medicine in the treatment of macrocytic anemia, sprue and other diseases. Polypeptides of this compound such as pteroylglutamylglutamic acid and pteroyldiglutamylglutamic acid likewise possess biological activity in a related form and are finding important application in the treatment of disease.

I have discovered that compounds having an amino group in place of the 4-hydroxy group on the pyrimidine ring of the compounds described in the aforementioned application of Waller and Mowat can be prepared and that many of these new compounds possess remarkable antagonistic activity to pteroylglutamic acid. The antagonistic action of the new compounds of the present invention makes them of great importance in experimental medicine.

The new compounds of the present invention may be represented by the following general formula:

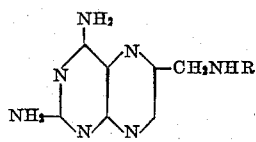

In this formula the group R represents an aromatic radical. These new compounds may be prepared by reacting 2,4,5,6-tetraaminopyrimidine with a dihalopropionaldehyde and a primary aromatic amine under conditions which will be described hereinafter. The reaction may be represented by the following equation in which X is a halogen and R is an aromatic radical:

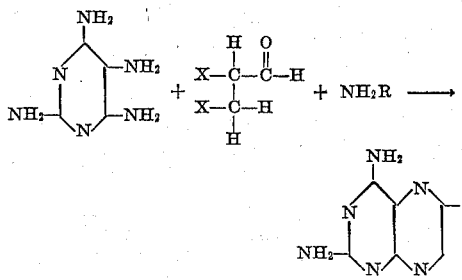

The reaction may be made to take place by simultaneously mixing the three intermediates together, preferably in the presence of water which serves as solvent for the intermediates and/or the reaction product. Suitable solvents for the reaction also include ethyl alcohol, acetone, benzene, carbon tetrachloride, chloroform, acetic acid and other organic liquids and mixtures thereof with each other or water. Some reaction may take place, however, by merely mixing the necessary reactants together and heating the mixture.

The reaction may take place over a wide range of temperatures of from about 0° C. up to about 100° C. or even higher. Likewise, the reaction will take place over a wide range of pH conditions, best results being obtained on the acid side at a pH within the range of about 1.5 to 6.

As noted above, the reaction may be caused to take place by mixing all three of the intermediates simultaneously and after reaction thereof recovering the resulting product. It may be desirable, however, in some cases to first react the 2,4,5,6-tetraaminopyrimidine with the dihalopropionaldehyde before adding the primary aromatic amine to the reaction mixture, or, on the other hand, to first react the primary aromatic amine with the dihalopropionaldehyde and then react the mixture with the tetraamine.

Then 2,4,5,6-tetraaminopyrimidine is a known compound. It may be added to the reaction mixture as a free base or in the form of one of its acid salts which are usually more readily available and easier to handle than the free base. It should be noted, however, that insofar as the reaction is concerned the effective reactant is probably the ionized form of the tetraamine. Tautomeric forms of the tetraamine are possible and are not excluded from the scope of the present invention.

The dihalopropionaldehydes that may be used in the process include alpha, beta-dibromopropionaldehyde; alpha, beta-dichloropropionaldehyde and others. As will be appreciated by chemists in the art, the corresponding acetals may also be employed without modification of the essential conditions of the reaction.

The primary aromatic amines which may be used include ortho, meta and para-aminobenzoic acid and the salts, esters and amides thereof. Compounds possessing the most marked biological activity are the amides of p-aminobenzoic acid in which the amide forming group is an amino acid. Particularly important intermediates include p-aminobenzoylglutamic acid and polypeptides thereof such as p-aminobenzoylglutamylglutamic acid, p-aminobenzoyldiglutamylglutamic acid and others having a plurality of peptide linkages made up of one or more of the various amino acids, such as p-aminobenzoylglutamylglycylglutamic acid. Compounds prepared with these intermediates have a wide range of biological activity and are the preferred products of the present invention. Of course, amides of p-aminobenzoic acid and other amino acids, such as glycine, aspartic acid, leucine, serine, sarcosine, phenylalanine, alanine, isovaline, cysteine and the like are also important intermediates of the present invention. The amino acids may be natural or synthetic and may be in any of the d, l, or d-l forms. The free carboxyl groups of these amides may be esterified, neutralized or converted into an amide without interfering with the essential reaction. In fact, in some cases it appears desirable to block off the free carboxyl group by such procedure before carrying out the reaction.

Other amides of aminobenzoic acid may also be employed in the process. Such include p-aminobenzamide and other amides formed by the reaction of aminobenzoic acid and aliphatic and aromatic amines such as ethylamine, ethanolamine, dodecylamine, ethylhexylamine, benzylamine, morpholine, aniline, 2-aminopyrimidine and the like.

It might be expected upon consideration of the reactants used in the process that the final product would be a dihydropterin. As shown, however, the resulting product has two less hydrogen atoms than expected, the product having a fused aromatic pyrimido-pyrazyl nucleus. The oxidation of the non-aromatic dihydro pyrimido-pyrazyl nucleus to the aromatic form occurs by some obscure mechanism such as internal oxidation or disproportionation in that the aromatic form is obtained even under nitrogen. Better results are obtained in the process, however, when oxidizing agents are added to the reaction mixture. Suitable oxidation agents are those having an oxidation-reduction potential of about —0.49 to —1.42 volts. Among these may be mentioned iodine, potassium bromate, chlorine, benzoquinone, manganese dioxide, sodium dichromate, ferric chloride, and still others. The use of some of these is illustrated in the specific examples.

The new compounds of the present invention may also be prepared by a process analogous to that described in the co-pending application of Martin E. Hultquist and Paul F. Dreisbach, Serial No. 701,082, filed October 4, 1946, now Patent No. 2,443,163. In this modification which is illustrated in some of the specific examples 2,4,5,6-tetraaminopyrimidine is reacted with an aromatic primary amine and a 1,1-dihalo-3-halopropanone-2. In general, the conditions described therein may be used to prepare the new compounds of the present invention.

The process and representative compounds of the invention will now be disclosed in detail in the following examples. It will be understood, of course, that other products using intermediates mentioned hereinbefore may be prepared by the same process, the only essential difference being in the selection of the particular primary aromatic amine employed. All parts are by weight unless otherwise indicated.

Example I 2.7 parts of 2,4,5,6-tetraaminopyrimidine sulfate and 2.4 parts of barium chloride.2H₂O are slurried with 60 parts of water at 60° C. for 10 minutes. After cooling to 45° C., 1.33 parts of p-aminobenzoylglutamic acid are added, and the pH is adjusted to 3, with caustic. The following solutions are then added simultaneously during 10 minutes: 2.2 parts of dibromopropionaldehyde dissolved in acetic acid; 1.3 parts of iodine and 2.5 parts of potassium iodide in 8 parts of water; and caustic to maintain the pH at 3. Agitation is continued at the same temperature and pH for an additional 30 minutes, after which the slurry is cooled, treated with 1 part of Hyflo, filtered and washed with water and alcohol.

A sample of the crude product containing 2 parts of N-(4-[2,4-diaminopyrimido [4,5-b] pyrazyl-6-methyl-amino] benzoyl) glutamic acid is slurried with 4 parts of lime and 2,000 parts of water at 60°-70° C. for 15 minutes. Hyflo is added, and the mixture filtered. The filtrate is treated with Hyflo and 20% zinc chloride solution to a pH of 10.6. The slurry is then clarified, and the filtrate heated to 80° C. Zinc chloride solution is added to pH 6.8, and the zinc salt is filtered with Hyflo. The cake is slurried with 4 parts of lime and 1000 parts of water at 90° C. and clarified. The filtrate is adjusted to pH 4 with dilute HCl, cooled and filtered with Hyflo. This cake is slurried with 4 parts of magnesium carbonate and 700 parts of water at 85°-90° C., stirred with 1.5 parts of Darco for 5 minutes and filtered. The filtrate is adjusted to pH 4, cooled and filtered. The product weighs 1.1 parts and assays 74.3%.

Further purification is accomplished by slurrying 1 part of the purified product with 0.5 part of magnesium oxide, 0.5 part of Darco and 50 parts of water at 90° C. The slurry is clarified hot, and the filtrate cooled to precipitate the magnesium salt. The magnesium salt is recrystallized repeatedly from water until a well crystallized product is obtained. This salt is then dissolved in 100 parts of hot water, the pH adjusted to 4 with dilute hydrochloric acid and the slurry cooled to precipitate the free acid. In 0.1 N NaOH solution it shows ultraviolet absorption maxima at 260, 284 and 370 m$\mu$ and minima at 239, 271 and 333 m$\mu$.

Example II

N-(4-[2,4-diaminopyrimido [4,5-b] pyrazyl-6-methyl amino] benzoyl) gamma-glutamyl gamma-glutamyl glutamic acid is obtained when 2.76 parts of ethyl p-aminobenzoyl gamma-glutamyl gamma-glutamyl glutamate is substituted for the p-aminobenzoylglutamic acid. In this case the product is a gum which solidifies on standing overnight in the refrigerator. After filtering, the product is immediately reslurried in water and frozen in a Dry Ice-acetone bath to be kept for analysis. Chemical assay shows a yield of 1.52 parts.

Example III 32.9 parts of 2,4,5,6-tetraaminopyrimidine sulfate and 21.2 parts of 3,5-dibromo-4-aminobenzoylglutamic acid are slurried with 700 parts of water at 80° C. 40 parts of tribromoacetone are added. The slurry is kept at 80° C. for an hour with the addition of caustic to maintain a pH of 2 to 2.5. The pH is then raised to 4, and the slurry is cooled and N-(3,5-dibromo-4-[2,4-diaminopyrimido [4,5-b] pyrazyl-6-methyl amino] benzoyl) glutamic acid obtained as the product filtered off.

Example IV

N-(4-[2,4-diaminopyrimido [4,5-b] pyrazyl-6-methyl amino] benzoyl) aspartic acid is prepared as described in Example III with the substitution of 12.6 parts of p-aminobenzoylaspartic acid for the dibromo-aminobenzoyl-glutamic acid. The yield of crude material is 33 parts which assays 18.2% real. Purification of the product is obtained by the method of Example I. When the magnesium salt is dissolved in 0.1 N NaOH solution at a concentration of about 20 gammas per ml. the ultra violet absorption spectra shows minima absorption at 237.5, 270 and 330 mμ and maxima at 260, 282.5 and 370 mμ. In 0.1 N HCl the maxima are at 242.5 and 290 and the minima at 235 and 260 mμ.

Example V 4-(2,4-diaminopyrimido [4,5-b] pyrazyl-6-methylamino) benzoic acid is prepared as described in Example III with the substitution of 6.85 parts of p-aminobenzoic acid for the dibromoaminobenzoyl glutamic acid. The yield is 27.8 parts, 19.4% real by chemical assay.

Example VI 27.4 parts of 2,4,5,6-tetraaminopyrimidine sulfate and 24.4 parts of barium chloride are stirred with 500 parts of water for 10 minutes at 60° C., and the mixture is then cooled to 45° C. 13.3 parts of p-aminobenzoyl glutamic acid are added, and the pH is adjusted to 3 with 5 N caustic. During 20 minutes the following items are added simultaneously: (1) 21.7 parts of 2,3-dibromopropionaldehyde dissolved in acetic acid; (2) 5 parts of sodium dichromate in 50 parts of water; (3) caustic as necessary to maintain the pH between 2.7-3.1. The reaction mixture is maintained at 45° C. and pH 2.7-3.1 for an additional 20 minutes. The pH is then adjusted to 4, and the mixture is cooled, filtered and dried. The yield is 60 parts of N-(4-[2,4-diaminopyrimido [4,5-b] pyrazyl-6-methylamino] benzoyl) glutamic acid assaying 12% real. Purification is accomplished by the method described above.

Example VII

This reaction is run as described in Example VI but with the omission of the sodium dichromate. The yield is 51.2 parts of material assaying 4% real.

Example VIII 11.9 parts of N-(p-nitrobenzoyl) alanine are dissolved in 200 parts by volume of alcohol. 0.5 part of 10% palladium on activated charcoal are added, and the mixture is hydrogenated at room temperature for 20 minutes. The mixture is filtered, and the filtrate concentrated in vacuum and finally dried in a desiccator over concentrated $H_2SO_4$. The product is dissolved in a mixture of 75 cc. of 1 N HCl and 50 cc. of water, treated with activated charcoal, filtered, and then neutralized with 75 cc. of 1 N NaOH. After cooling the N-(p-aminobenzoyl) alanine is filtered and washed with cold water.

On recrystallization from 60% alcohol it had a melting point of 192.5°-194° C.

2.74 parts of 2,4,5,6-tetraaminopyrimidine sulfate, 2.44 parts of $BaCl_2.2H_2O$, and 50 cc. of water are heated for 10 minutes at 60° C. and then cooled to 40° C. 1.04 parts of N-(p-aminobenzoyl) alanine are added, and the pH is adjusted with 5 N NaOH to 2.8-3.1.

To this mixture are added over a 20 minute period and from separate dropping funnels 4.3 parts of 50% dibromopropionaldehyde in acetic acid and 0.5 part of $Na_2Cr_2O_7.2H_2O$ in 5 parts of water. The temperature is held at 40-45° C. and caustic is added as required to hold the pH at 2.5-3.3. The mixture is stirred for 20 minutes longer at about 40° C. The pH is then adjusted with 5 N NaOH to 3.9, and the reaction is cooled for two hours, filtered, washed with water and dried. The yield is 5.8 parts of crude N-(4-[2,4-diaminopyrimido [4,5-b] pyrazyl-6-methyl amino] benzoyl) alanine which assays 10.1% real by chemical assay.

Example IX

N-(p-aminobenzoyl) phenylalanine is prepared by the catalytic hydrogenation of N-(p-nitrobenzoyl) phenylalanine. Recrystallization from 60% 2B alcohol yields a product melting at 195°-196° C.

Reaction of this material with 2,4,5,6-tetraaminopyrimidine sulfate and dibromopropionaldehyde as described above yields a product which assays 3.3% N-(4-[2,4-dimaninopyrimido [4,5-b] pyrazyl-6-methyl amino] benzoyl) phenylalanine by chemical assay.

Example X

N-(p-aminobenzoyl) valine is prepared by the catalytic hydrogenation of N-(p-nitrobenzoyl) valine. Recrystallization from 60% 2B alcohol yields a product melting at 196°-197° C.

Reaction of this material with 2,4,5,6-tetraaminopyrimidine sulfate and dibromopropionaldehyde as described above yields N-(4-[2,4-diaminopyrimido [4,5-b] pyrazyl-6-methyl amino] benzoyl valine which assays 7.3% real by chemical assay.

Example XI

N-(p-aminobenzoyl) serine is prepared by the catalytic hydrogenation of N-(p-nitrobenzoyl) serine. Recrystallization from water yields a product melting at 192° C. with decomposition.

Reaction of this material with 2,4,5,6-tetraaminopyrimidine sulfate and dibromopropionaldehyde as described above yields N-(4-[2,4-diaminopyrimido [4,5-b] pyrazyl - 6 - methyl amino] benzoyl) serine.

Example XII

N-(4-[2,4-diaminopyrimido [4,5-b] pyrazyl-6-methyl amino] benzoyl) sarcosine and N-(4-[2,4-diaminopyrimido [4,5-b] pyrazyl - 6 - methyl amino] benzoyl)-episilon-amino caproic acid were also prepared by similar methods.

I claim:

1. Compounds having the formula

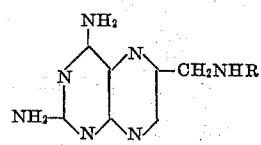

in which R is a monocyclic aromatic radical.

2. Compounds of the group having the formula

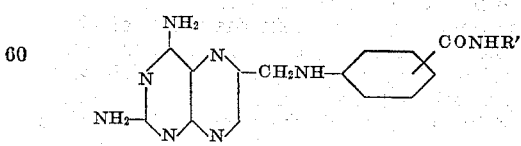

in which —NHR' is the radical of an amino acid and the salts of said compounds.

3. A compound of the group of those of claim 2 in which the radical —NHR' is that of glutamic acid.

4. N-(4-[2,4-diaminopyrimido [4,5-b] pyrazyl-6-methyl amino] benzoyl) glutamic acid.

5. N-(4-[2,4-diaminopyrimido [4,5-b] pyrazyl-6-methyl amino] benzoyl) aspartic acid.

6. N-(4-[2,4-diaminopyrimido [4,5-b] pyrazyl-6-methyl amino] benzoyl) serine.

7. A method which comprises mixing together under reactive conditions 2,4,5,6-tetraaminopyridine, an alpha, beta-dihalopropionalydehyde, and a primary monocyclic aromatic amine and after reaction thereof recovering a compound having the formula

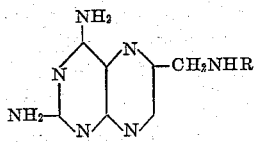

in which R is an monocyclic aromatic radical.

8. A method which comprises mixing together at a pH within the range of about 1.5 to 6.0 2,4,5,6-tetraaminopyrimidine, an alpha, beta-dihalopropionalydehyde, and a primary monocyclic aromatic amine and after reaction thereof recovering a compound having the formula

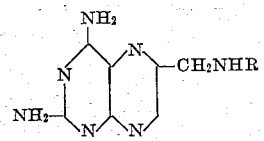

in which R is a monocyclic aromatic radical.

9. A method which comprises mixing together in a solvent at a pH within the range of about 1.5 to 6.0 and at a temperature within the range of about 0° C. up to about 100° C. 2,4,5,6-tetraaminopyrimidine, an alpha, beta-dihalopropionaldehyde, and a primary monocyclic aromatic amine and after reaction thereof recovering a compound having the formula

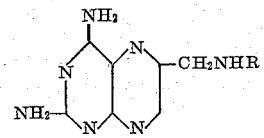

in which R is a monocyclic aromatic radical.

10. A method which comprises mixing together in a solvent at a pH within the range of about 1.5 to 6.0 and at a temperature within the range of about 0° C. up to about 100° C. 2,4,5,6-tetraaminopyrimidine, an alpha, beta-dichloropropionaldehyde, and a primary monocyclic aromatic amine and after reaction thereof recovering a compound having the formula

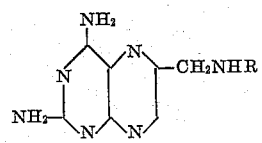

in which R is a monocyclic aromatic radical.

11. A method which comprises mixing together in a solvent at a pH within the range of about 1.5 to 6.0 and at a temperature within the range of about 0° C. up to about 100° C. 2,4,5,6-tetraaminopyrimidine, an alpha, beta-dibromopropionaldehyde, and a primary monocyclic aromatic amine and after reaction thereof recovering a compound having the formula

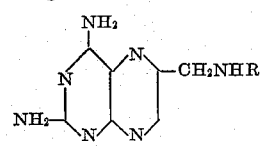

in which R is a monocyclic aromatic radical.

12. A method which comprises mixing together in a solvent at a pH within the range of about 1.5 to 6.0 and at a temperature within the range of about 0° C. up to about 100° C. 2,4,5,6-tetraaminopyrimidine, an alpha, beta-dihalopropionaldehyde, and an amino acid amide of p-aminobenzoic acid and after reaction thereof recovering a compound having the formula

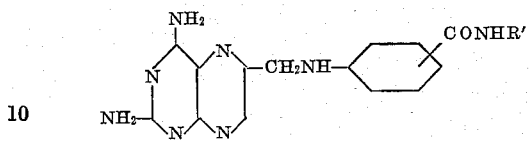

in which —NHR' is the radical of an amino acid.

13. A method which comprises mixing together in a solvent at a pH within the range of about 1.5 to 6.0 and at a temperature within the range of about 0° C. up to about 100° C. 2,4,5,6-tetraaminopyrimidine, an alpha, beta-dihalopropionaldehyde, and p-aminobenzoylglutamic acid and after reaction thereof recovering a compound having the formula

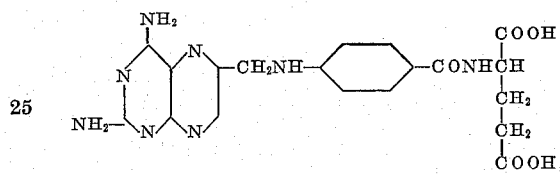

14. A method which comprises mixing together in a solvent at a pH within the range of about 1.5 to 6.0 and at a temperature within the range of about 0° C. up to about 100° C., 2,4,5,6-tetraaminopyrimidine, an alpha- beta-dihalopropionaldehyde, and p-aminobenzoylserine and after reaction thereof recovering a compound having the formula

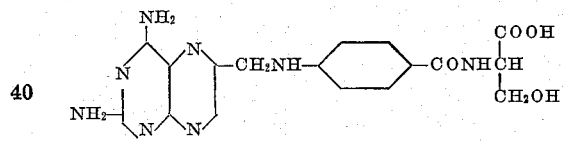

15. A method which comprises mixing together in a solvent at a pH within the range of about 1.5 to 6.0 and at a temperature within the range of about 0° C. up to about 100° C. 2,4,5,6-tetraaminopyrimidine, an alpha, beta-dihalopropionaldehyde, and p-aminobenzoylaspartic acid and after reaction thereof recovering a compound having the formula

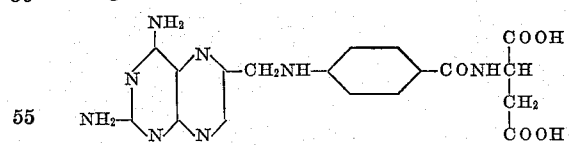

16. A compound of the formula;

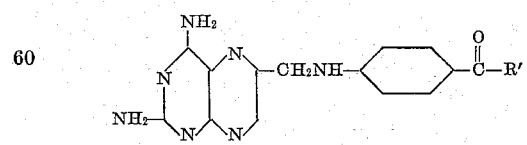

where R' is an aliphatic α-amino acid residue bound to the —CO— group in amide linkage through its nitrogen atom, and salts thereof.

DORIS R. SEEGER.

REFERENCES CITED

The following references are of record in the file of this patent:

Angier et al.: Science 103, 267–269 (1946).
Beilstein: Vierte Auflage, vol. 25, pp. 423–424.